Figure 1:
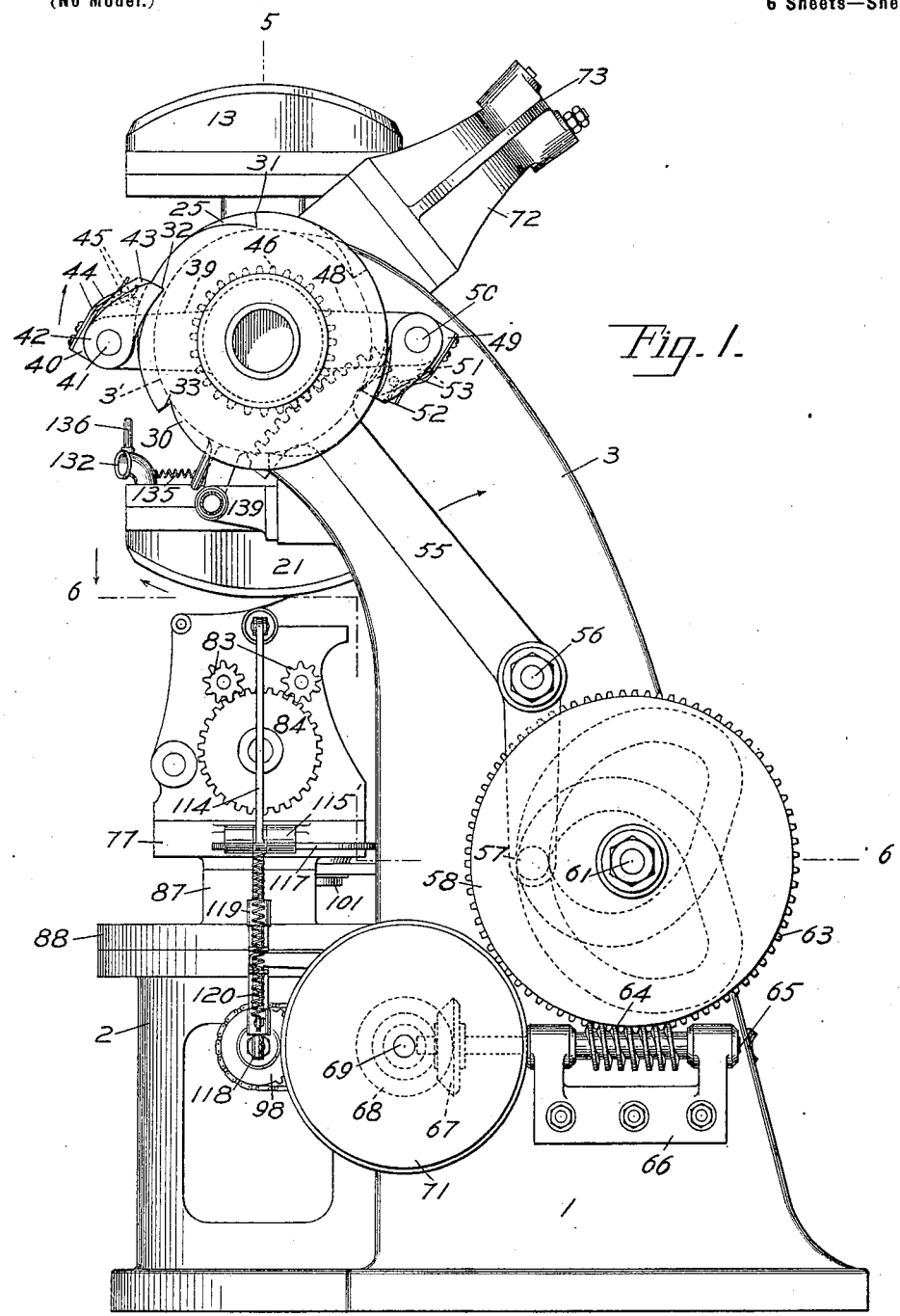

No. 654,196. Patented July 24, 1900.
O. TYBERG.
CIGAR MACHINE.
(Application filed Feb. 5, 1900.)

(No Model.) 6 Sheets—Sheet 1.

WITNESSES: INVENTOR
Olef Tyberg
BY
Philipp Phelps Sanger
ATTORNEYS

No. 654,196. Patented July 24, 1900.
O. TYBERG.
CIGAR MACHINE.
(Application filed Feb. 5, 1900.)
(No Model.) 6 Sheets—Sheet 2.
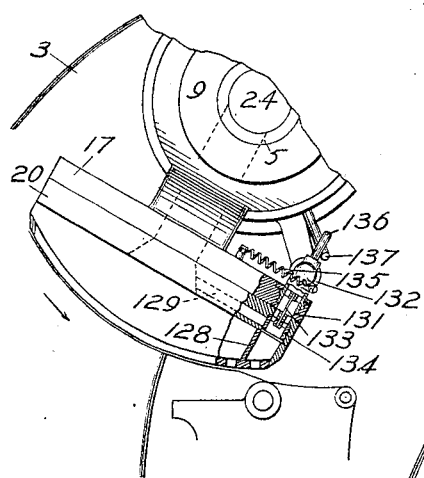
Fig. 3.
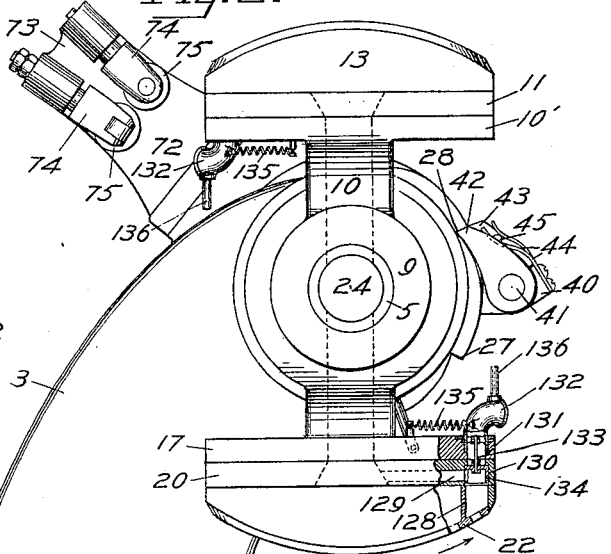
Fig. 2.
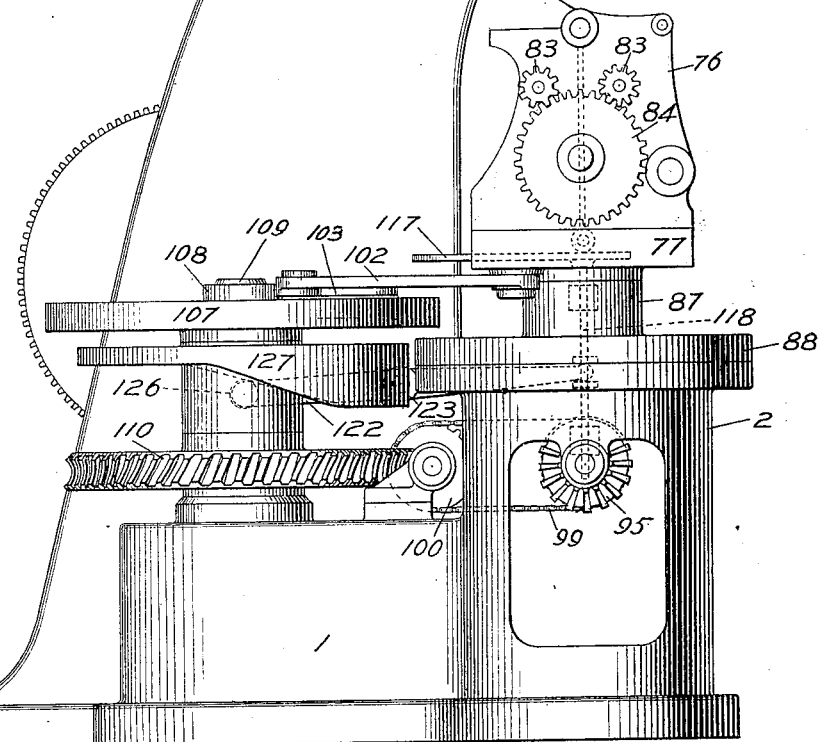
WITNESSES:
JV Bourke
TF Kehoe
INVENTOR
Oluf Tyberg
BY
Philipp Phelps Sange
ATTORNEYS.

No. 654,196. Patented July 24, 1900.
O. TYBERG.
CIGAR MACHINE.
(Application filed Feb. 5, 1900.)
(No Model.) 6 Sheets—Sheet 3.
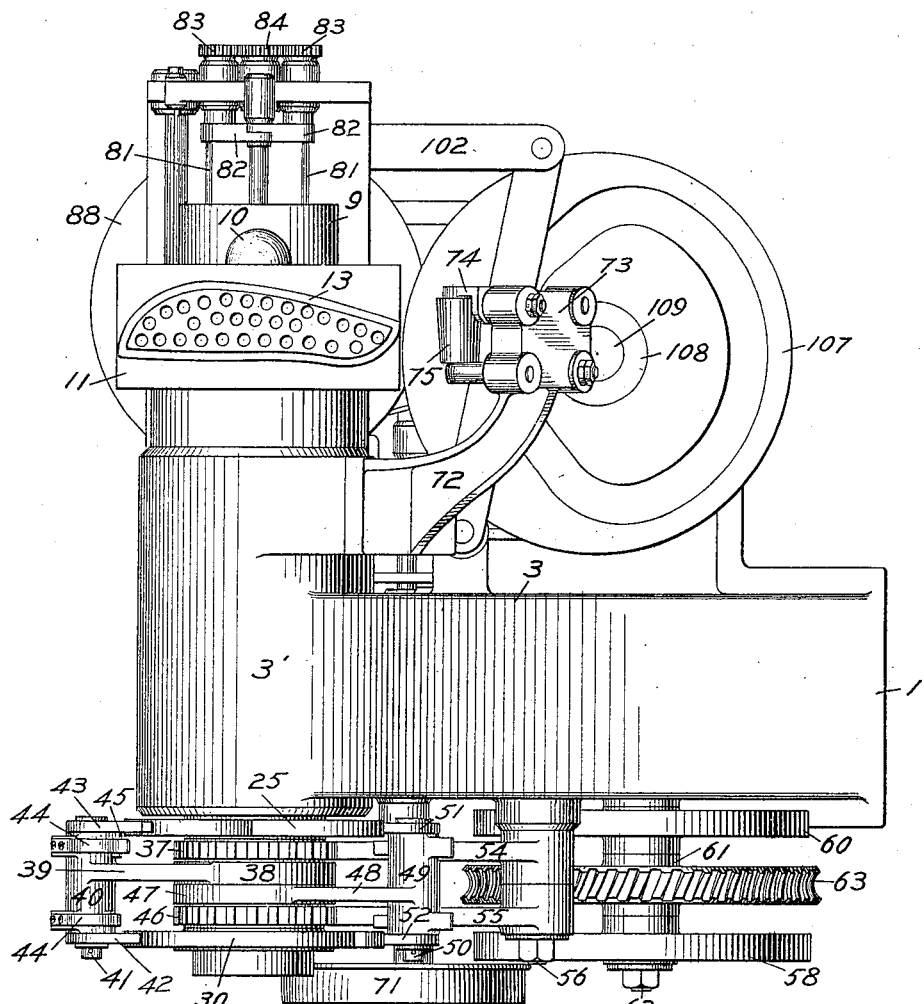
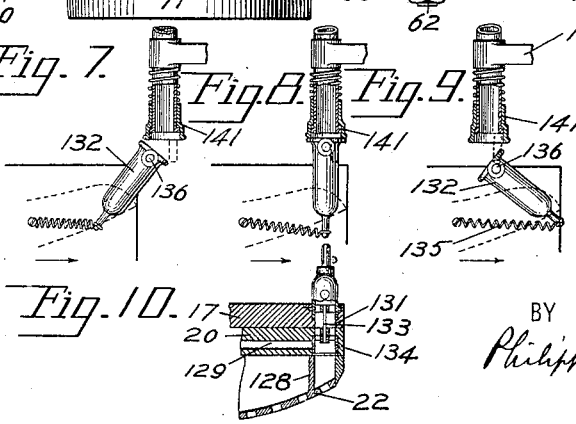
WITNESSES:
AV Bourke
O.F. Kahoe
INVENTOR
Oluf Tyberg
BY
Philipp Phelps Sawyer
ATTORNEYS.

No. 654,196. Patented July 24, 1900.
O. TYBERG.
CIGAR MACHINE.
(Application filed Feb. 5, 1900.)
(No Model.) 6 Sheets—Sheet 4.

WITNESSES:
INVENTOR
Oluf Tyberg
BY
ATTORNEYS

No. 654,196.  
O. TYBERG.  
CIGAR MACHINE.  
(Application filed Feb. 5, 1900.)

Patented July 24, 1900.

(No Model.)

6 Sheets—Sheet 5.

WITNESSES:

INVENTOR  
Oluf Tyberg  
BY  
Philipp Phelps Sawyer  
ATTORNEYS.

No. 654,196. Patented July 24, 1900.
O. TYBERG.
CIGAR MACHINE.
(Application filed Feb. 5, 1900.)
(No Model.) 6 Sheets—Sheet 6.
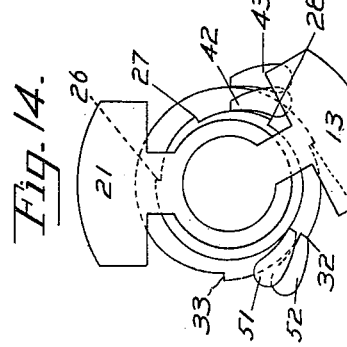
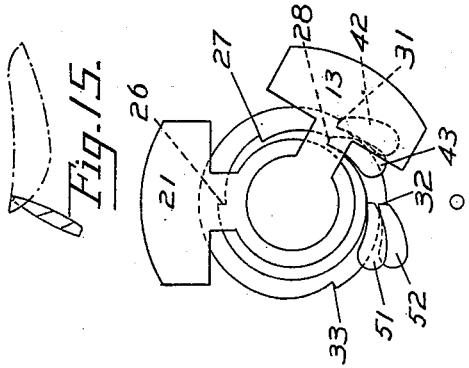
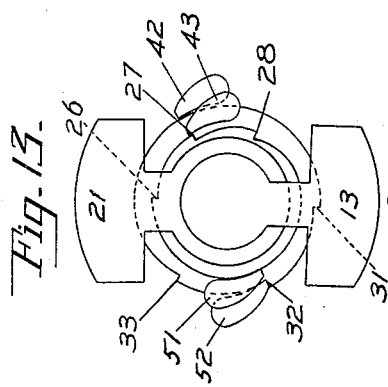
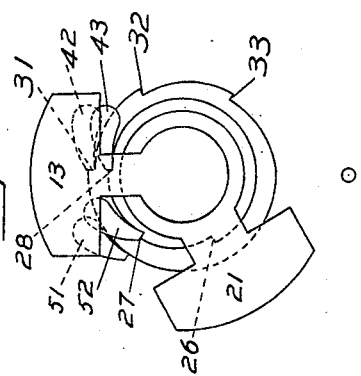
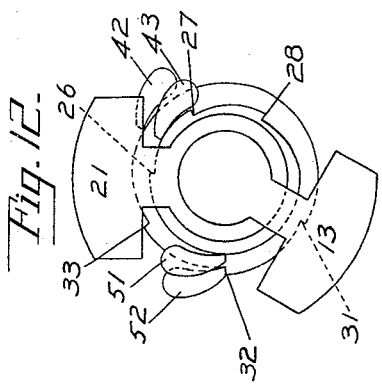
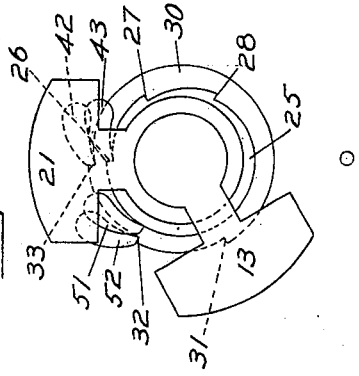
WITNESSES:
P. V. Bourke
J. F. Kehoe
INVENTOR
Oluf Tyberg
BY
Philip Phelps Sange
ATTORNEYS.

UNITED STATES PATENT OFFICE.

OLUF TYBERG, OF NEW YORK, N. Y., ASSIGNOR TO RUFUS L. PATTERSON AND GEORGE ARENTS, JR., OF SAME PLACE.

CIGAR-MACHINE.

SPECIFICATION forming part of Letters Patent No. 654,196, dated July 24, 1900.

Application filed February 5, 1900. Serial No. 4,074. (No model.)

*To all whom it may concern:*

Be it known that I, OLUF TYBERG, a citizen of the United States, residing at New York, county of New York, and State of New York, have invented certain new and useful Improvements in Cigar-Machines, fully described and represented in the following specification and the accompanying drawings, forming a part of the same.

This invention relates to certain improvements in cigar-machines.

In cigar-machines in which a wrapper is cut from a leaf of tobacco and then automatically fed to the wrapping mechanism it is desirable that the leaf be stretched to as great a degree as possible when the wrapper is cut therefrom and that the cut wrapper be retained in a stretched condition until it is delivered to the wrapping mechanism. If, as is usual, the wrapper is first cut on the cutting-bed and then delivered from said bed to a transferring mechanism by which it is in turn fed to the wrapping mechanism, there is a liability that the wrapper will shrink as it is delivered from the bed to the transferring mechanism. Furthermore, in machines in which a wrapper is automatically fed to the wrapping mechanism in order that the wrapper may be smoothly and evenly wound upon the cigar-bunch it is desirable that the wrapper be not only fed to the cigar-bunch and traversed along the same, but also that it have the angle at which it is presented to the wrapping mechanism varied, the amount of variation depending upon the shape of the cigar to be wrapped. In wrapping cigars of what is known in the art as the "perfecto" shape—that is, a cigar having its largest diameter in the center and tapering toward both ends—excellent results are produced in machines in which the wrapper is automatically fed to the wrapping mechanism by producing between the wrapper-support and the wrapping mechanism a movement which may be described as the resultant of a movement by which the wrapper-support and the wrapping mechanism are caused to approach each other, this being what may be termed the "approaching" movement, a "traversing" movement, and an "angular" movement. By the first of these movements, or the approaching movement, the wrapper is initially fed to the cigar-bunch. By the second of these movements, or the traversing movement, it is traversed along the bunch, and by the third of these movements, or the angular movement, its angle of presentation to the bunch is varied. It is of course obvious that this resultant movement can be produced by moving either the support or the wrapping mechanism, or both.

It is one of the objects of this invention to produce an improved cigar-machine in which the wrapper shall be cut on a support and thereafter fed by the said support directly to the wrapping mechanism, the support being provided with retaining means by which the wrapper is held in the same stretched condition in which it is cut.

A further object of the invention is to produce a cigar-machine in which two supports on which the wrappers are cut are provided, said supports being arranged to act as feeding devices, one of them being operated so as to deliver the cut wrapper to the wrapping mechanism while a fresh leaf is being placed on the other.

A further object of the invention is to produce a cigar-machine in which the wrapper shall be automatically fed to the wrapping mechanism and by which it is wrapped upon the cigar-bunch, the support and the wrapping mechanism being given during the wrapping operation movements so that the wrapper is presented to the cigar-bunch and wrapped thereon by the resultant of an approaching movement of the support and a traversing and an angular movement of the wrapping mechanism.

A further object of the invention is to produce an improved mechanism for mounting and controlling the wrapper-support in its movement.

A further object of the invention is to produce an improved mechanism for mounting and controlling the wrapping mechanism in its movement.

A further object of the invention is to produce a cigar-machine in which the wrapper shall be held on its support by means of a suction mechanism, and a blast device shall be provided for forcing one end of the wrapper into the jaws of the wrapping mechanism, the machine including improved means for controlling the operation of the blast.

With these and other objects in view the invention consists in certain constructions and in certain parts, improvements, and combinations, as will be hereinafter described and then specifically pointed out in the claims hereunto appended.

Figure 5:
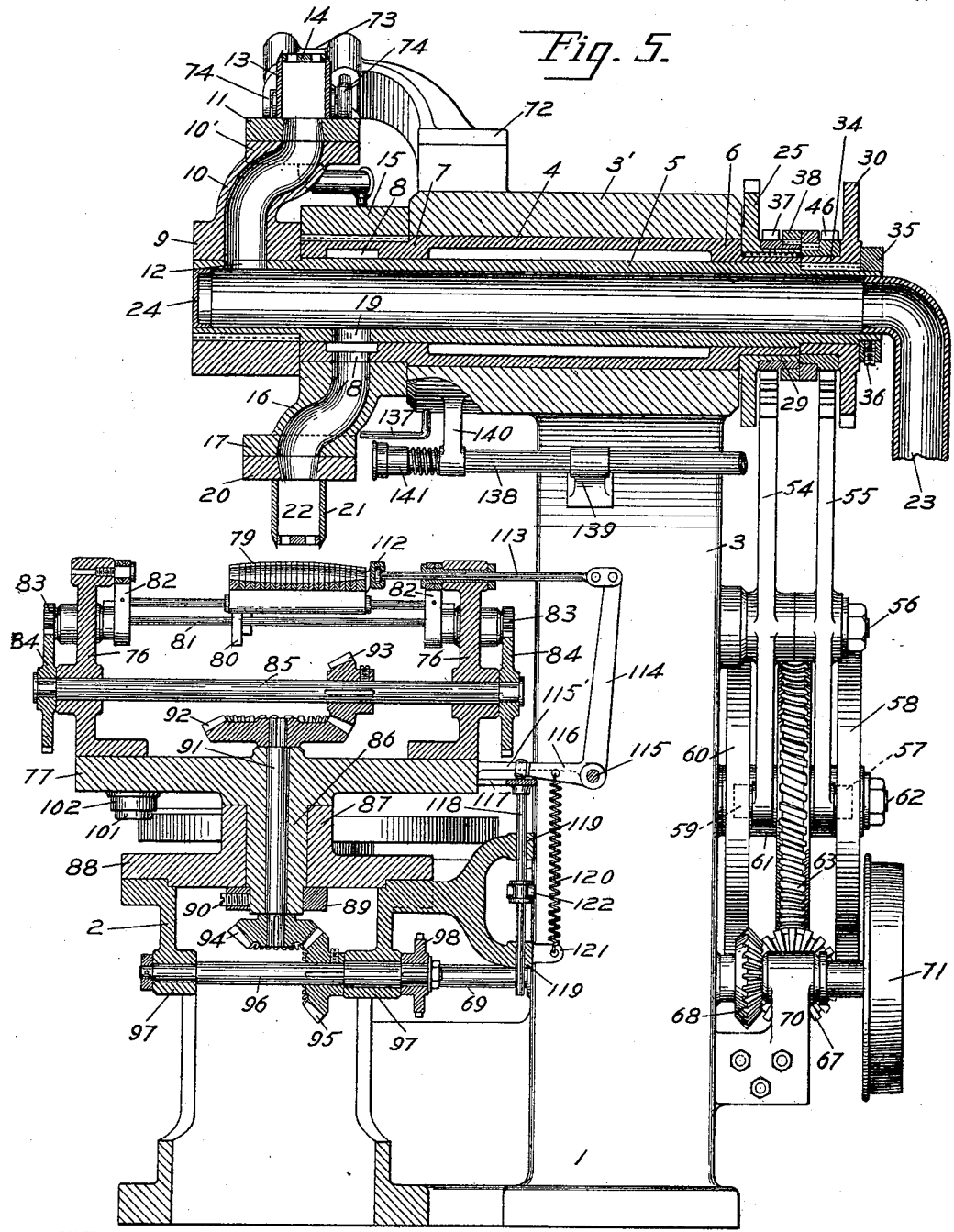
Figure 6:
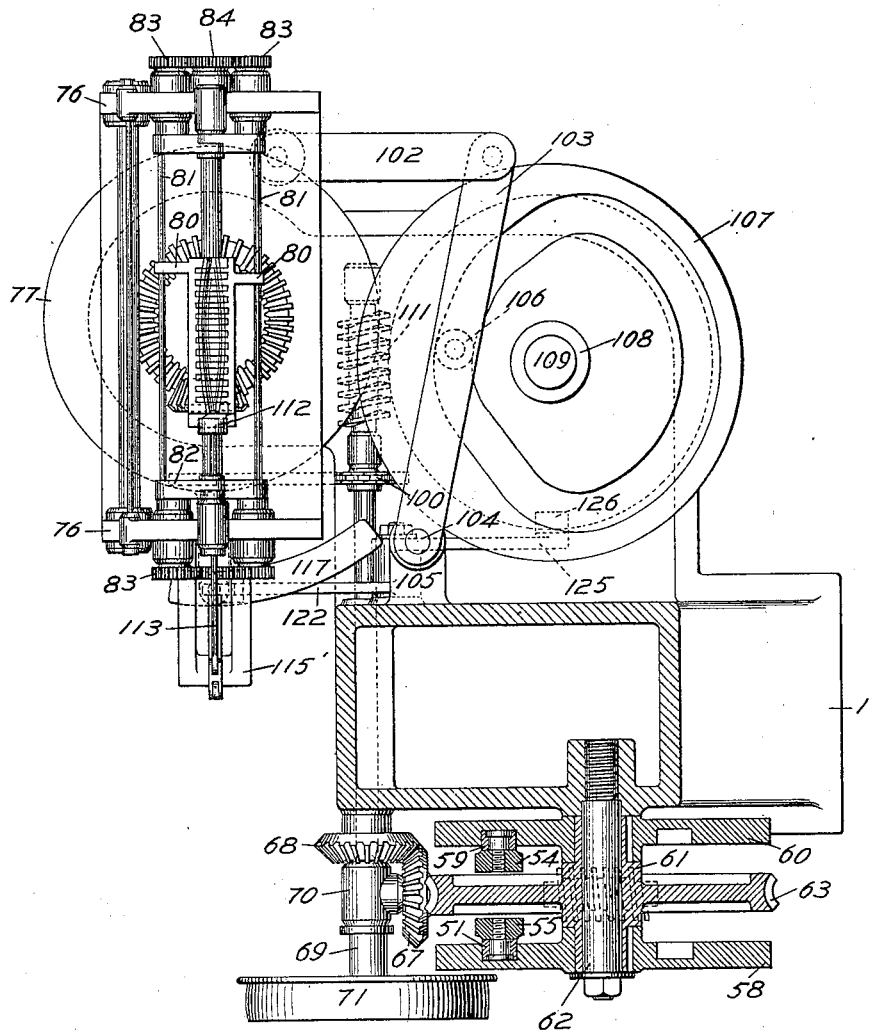
Figure 1:
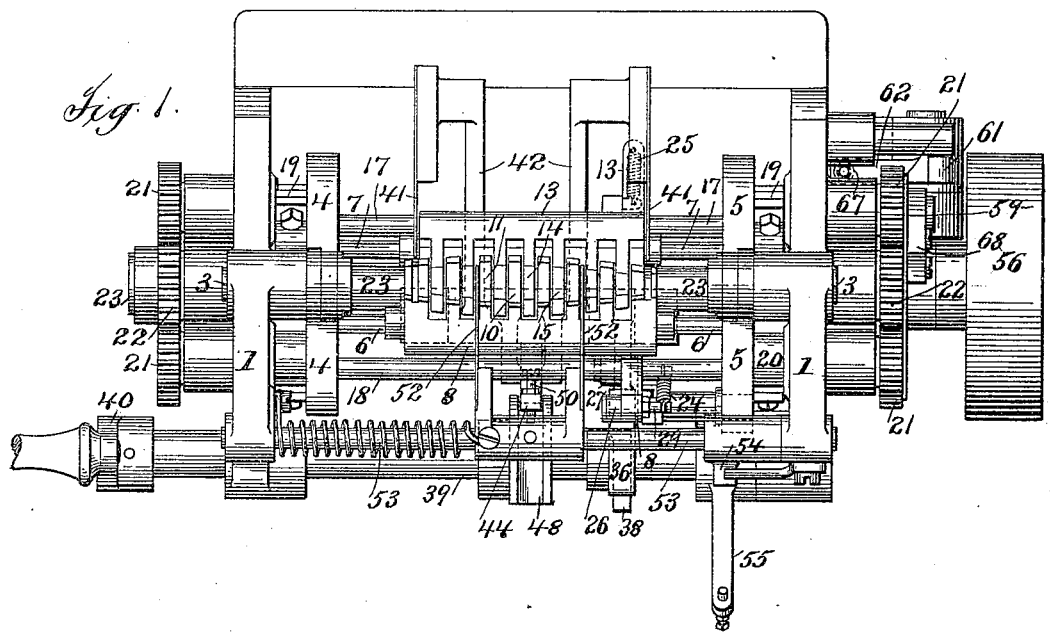
Figure 2:
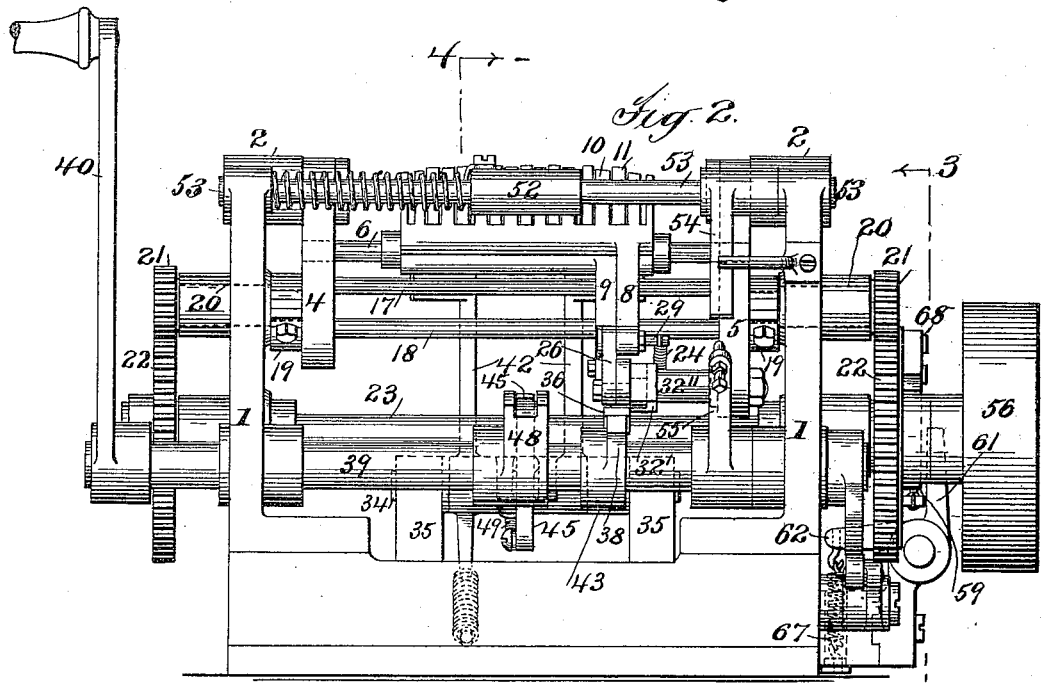

In the accompanying drawings, which form a part of this specification, and in which like characters of reference indicate the same parts, Figure 1 is an elevation of the machine looking at it from the outer side. Fig. 2 is an elevation of the machine looking at the side opposite to that shown in Fig. 1. Fig. 3 is a detail sectional view showing the support in the position which it occupies just after it has begun to deliver a wrapper to the wrapping mechanism and also illustrating the construction of the device for controlling the blast. Fig. 4 is a plan view of the machine. Fig. 5 is a vertical sectional view on the line 5 5 of Fig. 1. Fig. 6 is a horizontal section on the line 6 6 of Fig. 1. Figs. 7, 8, 9, and 10 are detail views illustrating the operation of the blast device. Figs. 11, 12, 13, 14, 15, and 16 are diagrammatic views illustrating the operation of the wrapper-supports. Figs. 17, 18, and 19 are diagrammatic views illustrating successive positions assumed by the wrapper-support and wrapping mechanism during the wrapping operation, said positions corresponding, respectively, to the positions illustrated in Figs. 12, 13, and 14.

Referring to the drawings, which illustrate one embodiment of the invention, 1 indicates the base of the machine, said base being provided with a machine-support 2 and an overhanging arm 3. The upper end of the overhanging arm 3 is constructed to provide a bearing 3', in which is located a hollow sleeve 4, (see Fig. 5,) this sleeve being arranged to be rotated in the bearing of the arm. Inside the sleeve 4 is located a second sleeve 5, said sleeve rotating in bearings 6 and 7, formed in the outer sleeve 4. The bearing 7 is provided with a circumferential groove or channel 8, the purpose of which will be hereinafter stated.

The inner sleeve 5 has mounted thereon or secured thereto a hub 9, from which extends a hollow arm 10, said arm terminating in or having secured thereto a perforated plate 10'. The opening in the arm 10 registers with an opening 12 in the sleeve 5. The plate 10' serves to support a plate 11, which in turn carries a knife 13, which is of the shape it is desired the wrapper shall have when cut, and lying in the space bounded by the knife is a perforated plate 14, which is or may be wedged into the knife and slightly below the cutting edge.

The outer sleeve 4 has secured to it by means of a key or in any other suitable manner a hub 15, said hub having secured thereto, preferably by being cast in one piece therewith, a curved hollow arm 16, which terminates in a plate 17. The passage in the arm 16 communicates with an opening 18 in the hub, said opening communicating with the channel 8, before referred to, the channel 8 being in communication with the passage through the sleeve 5 by means of an opening 19 in said sleeve. The plate 17 serves to support a perforated plate 20, which in turn carries a knife 21, also having the shape of the wrapper to be cut, a perforated plate 22 lying in the space surrounded by the knife.

It may be here remarked that any suitable suction device is connected to the sleeve 5, a pipe 23 being shown for that purpose. The other end of the passage in the sleeve 5 is closed by means of a plug 24 or in any other suitable manner. It will be seen that the perforated plates 14 and 22 and the parts immediately supporting them will constitute wrapper-supports, the wrappers being held thereon by the suction exerted in the sleeve 5 by the suction devices. (Not shown.) While perforated plates constitute the preferred form of wrapper-supports and the suction mechanism constitutes the preferred means for holding the wrappers on the supports, it will be understood that supports otherwise constructed may be used, if desired, and other forms of retaining devices may be used to hold the wrappers on the said supports.

The sleeves 4 and 5 are designed to be given an intermittent rotating movement. Any suitable construction may be employed for giving the sleeves their intermittent rotating movement. Preferably, however, the sleeve 4 will be provided with a notched disk 25, said disk being provided with three notches 26 27 28. The disk 25 has a hub 29 extending from one side thereof and is secured to the sleeve 4 in any suitable manner, as by a key or feather. The sleeve 5 has a similar notched disk 30 secured to it, said disk being provided with three notches 31 32 33, and it also has a hub 34 extending from one side thereof. The disk 30 and its hub may be secured to the sleeve 5 in any suitable manner, as by a key or feather, and both disks and their hubs are kept from slipping off the end of the sleeve in any suitable manner, as by a collar 35, held in position by a set-screw 36. Loosely mounted on the hub 29 is a gear 37, said gear having secured thereto in any suitable manner, as by a key, a collar 38, from which extends an arm 39, said arm terminating in a bearing 40. (See Fig. 4.) The bearing 40 serves to support a short shaft 41, on which are mounted two pawls 42 and 43, these pawls being held to their duty by means of springs 44, which bear on pins 45, extending from the sides of the pawls, said springs being secured to the bearing 40. In the same manner a loose gear 46 is mounted on the hub 34 of the notched disk 30. Connected to this gear 46 in any suitable manner, as by a key, is a collar 47, said collar having extending therefrom an arm 48, which terminates in a bearing 49. The bearing 49 supports a short shaft 50, which shaft carries two pawls 51 52, the pawls being spring-held in the same manner as the pawls 42 43 by springs 53. The short shaft 41 is of such a length that its pawl 42 engages and operates the disk 30, and its pawl 43 engages with and operates the disk 25. Similarly the short shaft 50 is of such a length that its pawl 51 engages with and operates the disk 25, and its pawl 52 engages with and operates the disk 30. It will, furthermore, be noted that the pawls 42 and 43 point in the opposite direction from the pawls 51 and 52. (See Fig. 1.) Since, however, these pawls are located on the opposite sides of the centers of these disks, they will always operate to rotate the disks in the same direction.

It is obvious that if the gears 37 and 46 are given a rotary reciprocating movement by any suitable mechanism the hubs 38 and 47 and the arms 39 and 48 will be given a similar movement, and the pawls carried on the shafts will, if they are in position to engage the notches on the circumference of the disks 25 and 30, move these disks, the sleeves to which they are attached, and the wrapper-supports carried by the sleeves.

Any suitable mechanism may be employed for rotating the gears. Preferably, however, the gear 37 will be operated by a segment-carrying lever 54, and the gear 46 will be operated by a similar segment-carrying lever 55, these levers being pivoted on a stud 56, connected to the shank of the overhanging arm 3. The lever 55 has a roller 57, (see Fig. 6 and dotted lines in Figs. 1 and 5,) which engages a cam-groove in a cam 58, and the lever 54 carries a roller 59, which engages a cam-groove in a cam 60. The cams 58 and 60 are secured to a sleeve 61, which is mounted on a stud 62, extending from the side of the overhanging arm 3. As will be seen from Fig. 1, the cam-grooves in the cams 58 and 60 are arranged so that the levers 54 and 55 are simultaneously oscillated in opposite directions.

Any suitable means may be employed for driving the cams and producing the oscillatory motions of the levers 54 and 55. Preferably, however, the sleeve 61 is provided with a worm-gear 63, which engages with a worm 64, mounted on a worm-shaft 65, said shaft being supported in ears in a bracket 66, secured to the side of the machine. The worm-shaft 65 is provided on its end with a bevel-gear 67, which meshes with a similar gear 68, mounted on a shaft 69. The shaft 69 constitutes the main power-shaft of the machine and is supported at its outer end by brackets 70, suitably fixed to the machine-frame, this shaft being provided with a pulley 71 or any other suitable means of transmitting power thereto.

The construction so far described is arranged to give an intermittent movement of rotation to the sleeves 4 and 5 and the wrapper-supports carried thereby. This intermittent rotation is such that one wrapper-support comes to rest in the position indicated in Figs. 1, 2, 4, and 5 and remains in this position while the operator places the leaf of tobacco from which the wrapper is to be cut in position on the support. It may be here remarked that the suction is continuously operating through the sleeve 5, so that as soon as the operator places a leaf on either the plate 14 or the plate 22 of the two supports and stretches it thereon the leaf will be held thereagainst by means of the suction. While this operation is going on the other suction-support is feeding its wrapper, which has been already cut, to the wrapping mechanism to be hereinafter described.

Any suitable form of cutting mechanism may be used to coöperate with the knives 13 and 21 to cut the wrapper from the leaves lying on the plates 14 and 22. Preferably, however, the overhanging arm 3 will be provided with a bracket 72, (see Figs. 2 and 4,) said bracket ending in a block 73, having vertical perforations therethrough. In these vertical perforations are mounted frames 74, in which are journaled rollers 75, the rollers being so positioned that the wrapper-supports in their movement will pass under them. As the supports rotate, therefore, the rollers 75 run over the knives 13 and 21 and force the leaves down upon the knives, thus cutting wrappers therefrom. The frames 74, which carry the rollers, may be made sufficiently heavy, so that the force of gravity alone will cause them to press the leaf against the knife, so as to cut a wrapper therefrom, or the frames may be spring-mounted, if desired. After the wrapper has been cut from the leaf the further rotation of the supports brings the wrapper into position to be fed to the wrapping mechanism. Any suitable form of wrapping mechanism may be used in connection with the feeding devices so far described. Preferably, however, the wrapping mechanism will be generally of the form shown in the patent to J. Reuse, No. 552,447, granted December 31, 1895, and reference is made to such patent for a full disclosure of the construction of said wrapping mechanism. For the purposes of this application it is sufficient to say that the wrapping mechanism is supported by side frames 76, said frames resting on a bed-plate 77. The wrapping is accomplished by two pairs of intermeshing jaws 79, said jaws being provided with extensions 80, which are operated by means of rotating rods 81. The rods 81 are carried in two pairs of arms 82, each pair being pivoted on a common center. The rods 81 work in slots in the extensions 80 and are given a rotating movement by means of gears 83, located at each end of the machine and meshing with larger gears 84, similarly located, the gears 84 being mounted on a shaft 85, which finds its bearings in the side frames 76.

The wrapping mechanism in this machine is designed to have both a traversing and an angular movement with respect to the wrapper-support. These movements may be given to the machine in various ways and by constructions differing widely in form. Preferably, however, as in the machine shown, the plate 77 is provided with a downwardly-extending perforated boss 86, which passes through a bearing 87, formed on a plate 88, which rests on the support 2. The boss 86 is held snugly in the bearing 87 by means of a collar 89, secured to the end of the boss 86 by means of a set-screw 90 or in any other suitable manner. Through the perforation in the boss 86 extends an intermediate shaft 91. This shaft is provided at its upper end with a bevel-gear 92, said gear meshing with a bevel driving-gear 93 on the shaft 85. The lower end of the intermediate shaft 91 is provided with a bevel-gear 94, which meshes with a similar bevel-gear 95 on a shaft 96, which is located in suitable bearings 97 in the support 2. The shaft 96 may be driven in any suitable manner. Preferably, however, it will be provided with a sprocket-wheel 98, said wheel being engaged by a sprocket-chain 99, which passes over a sprocket-wheel 100 on the main shaft 69. It is obvious that by this construction the wrapping mechanism can be turned about the center through which the shaft 91 passes, and this without interfering with the driving of the shaft 85.

Any suitable form of mechanism may be used for swinging the wrapping mechanism about its center. Preferably, however, the plate 77 will be provided with a downwardly-projecting stud 101, to which is secured a link 102. The link 102 is connected to a lever 103, suitably pivoted to a pin 104, located on a boss 105, extending from the side of the overhanging arm 3. The lever 103 is provided intermediate its ends with a cam-roll 106, which engages a cam-groove in a horizontal cam 107, which is secured to a sleeve 108, mounted on a stud 109, which extends upward from the base of the machine. As the sleeve 108 is rotated it is obvious that a swinging movement will be imparted to the wrapping mechanism around the shaft 91 as a center.

Any suitable means may be provided for driving the sleeve 108. In the machine shown the sleeve 108 is provided with a worm-gear 110, which meshes with a worm 111 on the main shaft 69.

In addition to the rotating movement which has just been described the wrapping mechanism is in this machine given a traversing movement with respect to the wrapper-support. This traversing movement may be effected by any suitable mechanism. In the machine shown, however, this traversing movement is effected by sliding the wrapping-jaws on their operating-rods, the rods being made long enough to permit this movement of the jaws. In order to effect this sliding movement of the jaws, one of them is provided with a grooved block 112, which is engaged by a sliding rod 113, this rod passing through the pivotal point of one of the arms 82. The sliding rod 113 has a link connection with one of the arms 114 of a bell-crank lever, which is pivoted at 115 to a bracket 115', extending from the machine-bed. The other arm 116 of the bell-crank lever is engaged by a curved operating-plate 117, which is carried on a rod 118. The rod 118 reciprocates in suitable bearings 119, formed in a bracket extending out from the support 2. The plate 117 is made long enough, so that as the wrapping mechanism swings on its center under the influence of the mechanism hereinbefore described the arm 116 will not pass off it. The arm 116 is held down against the plate by means of a pull-spring 120, secured to the arm and to an ear 121, extending from the bracket in which the bearings 119 are formed.

Any suitable means may be employed for reciprocating the rod 118, and thus rocking the bell-crank lever 116 114 and giving the wrapping mechanism its traversing movement. Preferably, however, the rod is engaged by one end of a forked arm 122, said arm extending from a sleeve 123, which is mounted on a stud 124, extending from the side of the overhanging arm 3. From the other end of the sleeve 123 extends an arm 125, said arm carrying a bowl 126, which engages with a cam 127, mounted on the sleeve 108. It is obvious, therefore, that as the sleeve 108 revolves the cams 107 and 127 will transmit rotating and traversing movements to the wrapping mechanism, the extent of these movements being controlled by the eccentricity of the cams.

It has already been stated that any suitable form of retaining devices may be used to hold the leaf of tobacco on the supports, but that suction devices are preferably used for this purpose. Preferably the suction devices will be arranged to hold the leaf throughout its entire surface, and when this is the case suitable means should be provided to detach the end of the leaf which is to be first fed to the wrapping mechanism. While any suitable device may be used for this purpose, that which will be preferably employed is a blast mechanism. To this end the chambers which are closed by the perforated plates 14 and 22 have a partition 128 across one end thereof, so as to cut off from the main support a smaller chamber, which is located at that end of the support which carries the end of the leaf which is to be first fed to the wrapping mechanism. In order that the suction and blast devices may operate on these smaller chambers, the plates 20 and 11 have longitudinal passages 129 through them, these passages connecting with the passages in the arms 10 and 16, which, as has been before said, are connected through the suction-passage in the sleeve 5. The plates 20 and 11 have passages 130 extending through them in a direction at right angles to the passages 129, with which passages they connect, and they also connect with the small chambers formed by the partitions 128. The plates 17 and 10' have similar passages 131, which passages register with the passages 130. In the passages 131 are located movable funnels 132, these funnels being secured in the openings 131 in any suitable manner. The funnels 132 are arranged to rotate in the openings 131, and they have connected to them valve-stems 133, to which are connected valves 134. These valves 134 work in the perforations 130, which form valve-chambers. The valves 134 are so arranged as to alternately close the openings 129 and 131, the construction being apparent by a comparison of Figs. 2 and 3, in which the valve 134 is shown in its two different positions. It is obvious that when the valve 134 is in the position shown in Fig. 3 the suction-passages 129 are closed and the passages 131 are opened. The funnels 132 are normally held in the position shown in Fig. 2—namely, in the position in which the passages 131 are closed and the passages 129 open—by means of springs 135, which are connected to the funnels and to the pins on the plates 10' and 17. Normally, therefore, the suction will be acting through the passages 129 on the chambers formed by the partitions 128. When, however, the suction-supports in their movement begin to approach the wrapping mechanism and are, therefore, nearly at the point where they are to deliver a wrapper thereto, a pin 136 on the funnel 132 strikes a pin 137 on the upper end of the overhanging arm. The further movement of the supports swings the funnel around so as to operate the valve to close the passage 129 and open the passage 131. At the same time the funnel is caused to register with a blast-pipe 138, which is secured to the overhanging arm 3, being carried by suitable brackets 139 and 140. The blast-pipe 138 has a spring-seated nozzle 141, the purpose of the spring being to prevent any shock to the parts as the funnel 132 comes into register therewith. As soon as the funnel 132 registers with the nozzle 141, which position is indicated in Fig. 3 and in the detail view Fig. 8 a blast of air is directed through the openings in the plates into the small chambers and blows the end of the wrapper down into the wrapping mechanism. The suction, however, retains the rest of the wrapper firmly on the suction-support. As the funnel continues its movement the pin 136 on the funnel 132 passes out of register with the pin 137, and the spring 135 then throws the funnel around to its normal position and causes the valve to close the passage 131 and open the passage 129.

The general operation of the machine is as follows, particular reference being had to the diagrams shown in Figs. 11 to 16, inclusive. In these diagrams, for the sake of clearness in illustration, the disk 30, which operates the sleeve 5, has been shown as larger in diameter than the disk 25, which operates the sleeve 4, although these disks are shown as of the same diameter in the figures illustrating the machine. Referring to the diagram Fig. 11, the support which carries the knife 21 is shown as having just come into its upper position, in which position it is about to receive a leaf from which a wrapper is to be cut. The support which carries the knife 13 is in the position which it occupies just prior to the time it begins the movement by which it feeds its wrapper to the wrapping mechanism. The two supports have been brought into these positions by the upward movement of the pawls 42 43, the pawl 43 engaging the notch 26 in the disk 25 and the pawl 42 engaging the notch 33 in the disk 30. It will be observed that the two disks are arranged at this time so that the notches 33 and 26 are in register; but the notches 27 and 28 are not in register with the notches 31 and 32. Since the notches 33 and 26 are in register and the pawls 42 and 43 are on the same horizontal shaft—namely, the shaft 41—each pawl will engage a notch in a disk, and the two disks, the sleeves to which they are attached, and the supports will move together. The upward feeding movement of the pawls is effected by the rotation of the gear 37, the segment-lever 54, and the cam 60. While the pawls 42 43 are making their upward feeding movement, the pawls 51 52 are being moved upward on their idle or retracting stroke in order to get into position to make a feeding movement after the movement of the pawls 42 43 is completed. This upward movement of the pawls 51 52 is effected by the rotation of the gear 46, the same being accomplished by the segment-lever 55 and the cam 58. In the position in which the parts are shown in Fig. 11 the pawls 42 43 have completed their feeding movement and the pawls 51 52 have completed their idle or retracting movement. It has heretofore been stated that the disks are arranged so that only one notch of the disk 25—namely, the notch 26—is in register with a notch on the disk 30—namely, the notch 33. It may also be here remarked that the notches are arranged at points sixty degrees apart and that the stroke of the pawls is one hundred and twenty degrees. When the parts come into the position shown in Fig. 11, therefore it follows that a notch—namely, the notch 32 of the disk 30—is under the pawl 52, and consequently the pawl 52 engages with the said notch. There is no notch in the disk 25 under the pawl 51, however. When now the pawls 52 51 make their forward feeding movement, the pawls 42 43 being at the same time retracted, it follows that the disk 30, the sleeve 5, and the support which carries the knife 13 will be advanced; but the disk 25 and its connected parts will not move, the pawl 51 passing idly over the unnotched portion of the periphery of the disk. Successive positions of the pawls, the disks, and the supports while the pawls 51 52 make their forward feeding movement and the pawls 42 43 are making their backward movement are indicated in Figs. 12, 13, 14, and 15. When the parts reach the position shown in Fig. 15, the disk 30 will have been advanced to that point where its notch 31 registers with the notch 28 in the disk 25, which disk, as has been before said, remains quiescent during the movement of the disk 30 and its connected parts. At the time when the notch 31 comes into register with the notch 28 the pawls 42 43 have completed their backward movement and now come into engagement with the two registering notches 31 28. The movement of the two sets of pawls is now reversed through the mechanism which operates them, the pawls 52 51 making their return stroke and the pawls 42 43 making their forward or feeding stroke. Since the pawls 42 43 are in engagement with the registering notches 31 28 on the disks 25 30, the two disks, the sleeves to which they are connected, and the supports will move together, one support passing under the rollers 75 and have a wrapper cut from the leaf it carries and the other support coming into position to receive a fresh leaf and will continue to move together until the pawls 43 42 complete their forward movement and the pawls 51 52 complete their retracting movement. The position of the parts when this movement is completed is illustrated in Fig. 16. At this time it will be seen that there is no notch on the disk 30 with which the pawl 52 can engage; but the notch 27 on the disk 25 is under and engaged by the pawl 51. The movement of the pawls is again reversed, the pawls 52 51 now making their forward or feeding movement and the pawls 42 43 making their return movement. During this forward feeding movement of the pawls 52 51 the pawl 52 slips idly over the unnotched portion of the disk 30; but the disk 25, the sleeve 4, and the support carrying the knife 21 are advanced, the support being caused to thus make the movement by which the wrapper is fed to the wrapping mechanism. Just before the support reaches the position in which to deliver its wrapper to the wrapping-jaws the pin 136 on the movable funnel 13 strikes the pin 137 and the funnel is swung around so that its mouth registers with the spring-nozzle 141 on the blast-pipe 138. This movement of the funnel closes the passage by which the small chamber in the support communicates with the suction and opens the passage by which it communicates with the blast. The end of the wrapper is now, therefore, blown down into the wrapping-jaws and onto the bunch contained therein. As soon as the wrapper is in position to be seized by the wrapping-jaws these jaws begin their wrapping movements being thrown into operation by suitable clutch devices (not shown) and the support begins its approaching movement to deliver the wrapper. As the support feeds the wrapper to the wrapping mechanism the wrapping-jaws 79 are caused to move under the support and along their operating and supporting rods, this movement being effected by the bell-crank lever 114 116 and the link connecting-rod 113. The bell-crank lever 114 116 is operated by the vertical sliding rod 118, which carries the plate 117, this plate being, as has been before said, so shaped as to permit a pivotal movement of the wrapping mechanism and the bell-crank lever without allowing the end of the bell-crank lever to slip off the plate. Simultaneously with or soon after the wrapping mechanism begins to take the wrapper the cam 107, operating through the levers 102 103, swings the wrapping mechanism on its vertical pivot, thus varying the angle at which the wrapper is presented to the cigar-bunch in the wrapping mechanism. It will of course be understood that the wrapping-jaws continue the wrapping operation during both movements of the wrapping operation before referred to. After the wrapping mechanism has completed the wrapping operation it is brought to a stop through the medium of clutches (not herein shown) and the completed cigar is removed. In the meantime the other wrapper-support has been moved so as to have a wrapper cut from the leaf which has been placed therein and into the position where it is about to begin to feed the wrapper thus cut to the wrapping mechanism, the first wrapper-support being in the meantime brought into position where a fresh leaf can be placed thereon and remaining stationary during the delivery of the wrapper by the other support.

By the term "approaching" movement is not meant that all parts of the support approach the wrapping mechanism during the wrapping operation, since in the machine shown that part of the support from which the wrapper has been delivered moves away from the wrapping mechanism. That part of the support which still retains the wrapper, however, continues to approach the wrapping mechanism during the wrapping operation, and hence the term "approaching" is deemed a proper one to apply to this movement of the support.

It will be understood that the several mechanisms by which the various operations which have been described are carried into effect may be varied within wide limits. The invention is not, therefore, to be limited to the specific mechanisms which have been herein shown and described.

What is claimed is—

1. In a cigar-machine, the combination with a wrapping mechanism, of a wrapper-support, means for cutting a wrapper from a leaf of tobacco while on the support, means for giving the support an approaching movement with respect to the wrapping mechanism, and means for giving the wrapping mechanism a traversing movement with respect to the support, substantially as described.

2. In a cigar-machine, the combination with a wrapping mechanism, of a suction-support for the wrapper, means for cutting a wrapper from a leaf of tobacco while on the support, means for giving the support an approaching movement with respect to the wrapping mechanism, and means for giving the wrapping mechanism a traversing movement with respect to the support, substantially as described.

3. In a cigar-machine, the combination with a wrapping mechanism, of a wrapper-support, means for cutting a wrapper from a leaf of tobacco while on the support, means for giving the support an approaching movement with respect to the wrapping mechanism, and means for giving the wrapping mechanism an angular movement with respect to the support, substantially as described.

4. In a cigar-machine, the combination with a wrapping mechanism, of a suction-support for the wrapper, means for cutting a wrapper from a leaf of tobacco while on the support, means for giving the support an approaching movement with respect to the wrapping mechanism, and means for giving the wrapping mechanism an angular movement with respect to the support, substantially as described.

5. In a cigar-machine, the combination with a wrapping mechanism, of a wrapper-support, means for cutting a wrapper from a leaf of tobacco while on the support, means for giving the support an approaching movement with respect to the wrapping mechanism, and means for giving the wrapping mechanism a traversing and an angular movement with respect to the support, substantially as described.

6. In a cigar-machine, the combination with a wrapping mechanism, of a suction-support for the wrapper, means for cutting a wrapper from a leaf of tobacco while on the support, means for giving the support an approaching movement with respect to the wrapping mechanism, and means for giving the wrapping mechanism a traversing and an angular movement with respect to the support, substantially as described.

7. The combination with a wrapping mechanism, of means for presenting a wrapper thereto, and means for giving the wrapping mechanism a traversing and an angular movement with respect to the wrapper-presenting means during the wrapping operation, substantially as described.

8. In a cigar-machine, the combination with a wrapper-support, of a wrapping mechanism, means for producing a relative approaching movement between the support and the wrapping mechanism, and means for giving the wrapping mechanism a traversing and an angular movement with respect to the support, substantially as described.

9. In a cigar-machine, the combination with a wrapping mechanism, of a wrapper-support, means for retaining a wrapper thereon in a stretched condition, means for producing a relative approaching movement between the support and the wrapping mechanism, and means for giving the wrapping mechanism a traversing and an angular movement with respect to the support, substantially as described.

10. In a cigar-machine, the combination with a wrapping mechanism, of a suction-support for the wrapper, means for producing a relative approaching movement between the support and the wrapping mechanism, and means for giving the wrapping mechanism a traversing and an angular movement with respect to the support, substantially as described.

11. In a cigar-machine, the combination with a wrapping mechanism, of a wrapper-support, means for giving the support an approaching movement with respect to the wrapping mechanism, and means for giving the wrapping mechanism a traversing and an angular movement with respect to the support, substantially as described.

12. In a cigar-machine, the combination with a wrapping mechanism, of a wrapper-support having means for retaining a wrapper thereon in a stretched condition, means for giving the support an approaching movement with respect to the wrapping mechanism, and means for giving the wrapping mechanism a traversing and an angular movement with respect to the support, substantially as described.

13. In a cigar-machine, the combination with a wrapping mechanism, of a suction-support for the wrapper, means for giving the support an approaching movement with respect to the wrapping mechanism, and means for giving the wrapping mechanism a traversing and an angular movement with respect to the support, substantially as described.

14. In a cigar-machine, the combination with a wrapping mechanism, of a wrapper-support, means for giving said support an approaching movement in a path which does not intersect the wrapping mechanism, and means for giving the wrapping mechanism a traversing and an angular movement with respect to the support, substantially as described.

15. In a cigar-machine, the combination with a wrapping mechanism, of a wrapper-support having means for retaining a wrapper thereon in a stretched condition, means for giving the support an approaching movement in a path which does not intersect the wrapping mechanism, and means for giving the wrapping mechanism a traversing and an angular movement with respect to the support, substantially as described.

16. In a cigar-machine, the combination with a wrapping mechanism, of a suction-support for the wrapper, means for giving the support an approaching movement in a path which does not intersect the wrapping mechanism, and means for giving the wrapping mechanism a traversing and an angular movement with respect to the support, substantially as described.

17. The combination with a plurality of wrapper-supports, of means for moving the supports simultaneously in a given path, and means for moving each support independently in the same path, substantially as described.

18. The combination with a plurality of wrapper-supports, of means for moving the supports simultaneously in a given path, means for moving each support independently in the same path, and suction mechanism coöperating with each support to hold a wrapper thereagainst, substantially as described.

19. The combination with a plurality of supports, of means for moving the supports simultaneously in a given path, means for moving each support independently in the same path, means for retaining a leaf of tobacco on each support, and means coöperating with each support to cut a wrapper from the leaf of tobacco during the movement of the support, substantially as described.

20. The combination with a plurality of supports, of means for moving the supports simultaneously in a given path, means for moving each support independently in the same path, suction mechanism coöperating with each support to hold a leaf of tobacco thereagainst, and means coöperating with each support to cut a wrapper from the leaf of tobacco during the movement of the support, substantially as described.

21. The combination with a wrapping mechanism, of a pair of sleeves rotating about a common center, a wrapper-support carried by each sleeve, means for rotating the sleeves simultaneously about the center, and means for rotating each sleeve independently about the center, substantially as described.

22. The combination with a pair of sleeves rotating about a common center, of a wrapper-support carried by each sleeve, means for rotating the sleeves simultaneously about the center, means for rotating each sleeve independently about the center, and a cutting mechanism in the path of movement of the supports, substantially as described.

23. The combination with a pair of sleeves rotating about a common center, of a suction wrapper-support carried by each sleeve, means for rotating the sleeves simultaneously about the center, means for rotating each sleeve independently about the center, and a cutting mechanism in the path of movement of the supports, substantially as described.

24. The combination with a wrapping mechanism, of a pair of sleeves rotating about a common center, a suction-support for the wrapper carried by each sleeve, means for rotating the sleeves simultaneously about the center, and means for rotating each sleeve independently about the center, substantially as described.

25. The combination with a wrapping mechanism, of a pair of sleeves rotating about a common center, a wrapper-support carried by each sleeve, means for rotating the sleeves simultaneously about the center, means for rotating each sleeve independently about the center, and cutting devices in the path of movement of the supports, substantially as described.

26. The combination with a wrapping mechanism, of a pair of sleeves rotating about a common center, a suction-support for the wrapper carried by each sleeve, means for rotating the sleeves simultaneously about the center, means for rotating each sleeve independently about the center, and cutting devices in the path of movement of the supports, substantially as described.

27. The combination with a wrapping mechanism, of a pair of rotating sleeves, a suction-support for the wrapper carried by each sleeve, a knife on each support, means for rotating the sleeves simultaneously about a common center, means for rotating each sleeve independently about the center, and a coöperating cutting device lying in the path of movement of the supports, substantially as described.

28. The combination with a wrapping mechanism, of a pair of rotating sleeves, a bent hollow arm connected to each sleeve, a knife carried by each arm, a suction-plate located in the space bounded by each knife, means for moving the sleeves simultaneously about a common center, means for moving each sleeve independently about the center, and a coöperating cutting device lying in the path of movement of the knives, substantially as described.

29. In a suction-support, the combination with a suction-pipe and a blast-pipe, of two chambers, connections between both of the chambers and the suction-pipe, means whereby a connection may be established between one of the chambers and the blast-pipe, said means including a movable funnel, and means operated by the movement of the funnel for closing the connection of said chamber to the suction-pipe and opening its connection to the blast-pipe, substantially as described.

30. The combination with a wrapping mechanism, of a suction-support for the wrapper including two chambers, a suction-pipe, connections between said pipe and both the chambers, a blast-pipe, means including a spring-controlled movable funnel for connecting the blast-pipe to one of the chambers, a two-way valve controlled by the funnel, said funnel being normally in such position that the valve closes the blast-pipe connections and opens the suction-pipe connections, and means located in the path of movement of the support for moving the funnel and operating the valve to close the suction-pipe connections and open the blast-pipe connections, substantially as described.

31. In a cigar-machine, the combination with a pair of wrapper-supports, of a pair of rotary disks, means for alternately rotating each of the disks independently, and means for simultaneously rotating the disks, said No. 654,197. Patented July 24, 1900.
O. TYBERG.
CIGAR MACHINE.
(Application filed Feb. 5, 1900.)

(No Model.) 2 Sheets—Sheet 1.

Attest:
A. V. Bourke
T. F. Kehoe

Inventor:
Oluf Tyberg
By
Philipp Phelps Langer
Attys

THE NORRIS PETERS CO., PHOTO-LITHO., WASHINGTON, D. C.